Patented June 27, 1933

1,916,089

REISSUED
UNITED STATES PATENT OFFICE

MAX WOELM, OF SPANGENBERG NEAR KASSEL, GERMANY, ASSIGNOR, BY MESNE ASSIGNMENTS, TO NOVOCOL CHEMICAL MFG. CO. INC., OF BROOKLYN, NEW YORK, A CORPORATION OF NEW YORK

PROCESS FOR THE PRODUCTION OF ANESTHETIC SOLUTIONS

No Drawing. Application filed July 23, 1928, Serial No. 294,931, and in Germany May 2, 1927.

It is known (see for instance an article by Läwen and Gross in Münchener Medizinische Wochenschrift 1910, No. 39) that the addition of sodium bicarbonate to such solutions of either organic or synthetic suprarenal gland preparations as have an anesthetic effect and simultaneously render tissues bloodless, will reduce the acidity of the solution and render it more suitable for injection. The anesthetic solution may be prepared by mixing a suprarenal gland preparation (for instance suprarenin) with anesthetic preparations, such as for instance p-aminobenzoyl-diethyl-amino-ethanol hydrochloride (known as novocain), a-dimethyl amino-b-methyl butanol hydrochloride, benzoyl-ethyl-tetramethyl diamino-isopropanol hydrochloride. Solutions thus treated by adding sodium bicarbonate are unsatisfactory because they are unstable and become decomposed or cloudy in a very short time, so as to be unserviceable for injection.

I have found that I can obtain non-irritating, stable, comparatively alkaline solutions of suprarenal gland preparations by adding disodium phosphate instead of the sodium bicarbonate above referred to. The disodium phosphate imparts a slightly alkaline character to the solutions and renders them stable for a sufficient length of time to permit their use for injection. When the solutions are rendered slightly alkaline they remain clear for at least ten minutes, which is a sufficient length of time to permit the injection to be successfully accomplished.

In order to avoid with absolute certainty the decomposition of the alkali-sensitive bases, the individual ingredients intended for preparing the solution are kept separate until shortly before such solution is to be used. For storing these ingredients separately, in the proper proportions for producing the desired solution, I prefer to employ two-compartment flasks or receptacles of any suitable well-known or approved construction, such as for instance those disclosed in U. S. Patents 1,570,346 and 1,592,632.

The aqueous solvent and the other ingredients (the latter in a dry condition) are kept separate in the respective compartments of such a receptacle, yet handy for immediate use in preparing a solution for injection.

As an example, the following composition is given, the quantities being understood as applying to 1 cubic centimeter of solution: .02 milligrams of p-aminobenzoyl-diethyl-amino-ethanol-hydrochloride (known as novocain, an anesthetic), .000036 milligrams of o-dioxyphenylethanolmethylamin bitartrate (known as epinephrine, adrenaline, or suprarenin), .003 milligrams of disodium phosphate (sörensen).

I claim:

1. In the process for the production of nonirritating anesthetic solutions stable for a sufficient length of time to permit of their use for injection, the step which consists in adding to an anesthetic solution containing epinephrine, an amount of disodium phosphate sufficient to impart a slightly alkaline character to the solution.

2. In the process for the production of non-irritating anesthetic solutions stable for a sufficient length of time to permit of their use for injection, the step which consists in adding to a solution of p-aminobenzoyl-diethyl-amino-ethanol hydrochloride containing epinephrine, an amount of disodium phosphate sufficient to impart a slightly alkaline character to the solution.

3. An anesthetic solution for hypodermic injection containing a solvent, an acid-containing anesthetic material for local anesthesia, epinephrine, and an alkaline buffer salt of a stable acid in sufficient quantity to impart a nearly neutral character to the solution.

4. An anesthetic solution for hypodermic injection containing water as a solvent, an acid salt of procaine, epinephrine, and a sufficient quantity of disodium phosphate to produce a nearly neutral solution.

5. An anesthetic composition to be mixed with water to produce an anesthetic solution comprising an acid-containing local anesthetic material, epinephrine, and an alkaline buffer salt of a stable acid in sufficient quantity to produce a nearly neutral condition in the resulting solution.

In testimony whereof I affixed my signature.

MAX WOELM.